US006587257B1

(12) United States Patent
Davies

(10) Patent No.: US 6,587,257 B1
(45) Date of Patent: \*Jul. 1, 2003

(54) NON-LINEAR SUBCARRIER PREDISTORTION AND UPCONVERSION SYSTEM

(75) Inventor: Robert James Davies, Calgary (CA)

(73) Assignee: Telecommunications Research Laboratories, Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/347,899

(22) Filed: Jul. 1, 1999

Related U.S. Application Data

(63) Continuation-in-part of application No. 08/873,967, filed on Jun. 12, 1997, now Pat. No. 5,999,300.

(51) Int. Cl.$^7$ ............................. G02F 1/35; G02F 2/02
(52) U.S. Cl. ...................... 359/328; 359/326; 359/327; 359/330; 359/331
(58) Field of Search ............................. 359/326, 327, 359/328, 329, 330, 331, 332

(56) References Cited

U.S. PATENT DOCUMENTS

| | | | |
|---|---|---|---|
| 5,040,865 A | 8/1991 | Chen et al. | 350/96.14 |
| 5,239,401 A | 8/1993 | Olshansky | 359/188 |
| 5,453,868 A | * 9/1995 | Blauvelt et al. | 359/161 |
| 5,515,199 A | * 5/1996 | Farina | 359/238 |
| 5,999,300 A | * 12/1999 | Davies et al. | 359/181 |

OTHER PUBLICATIONS

RACE R2005: microwave optical duplex antenna link, J.J. O'Reilly et al., IEE Proceedings–J, vol. 140, No. 6, Dec. 1993, pp. 385–391.

Comparison of Indirect Optical Injection–Locking Techniques of Multiple X–Band Oscillators, Afshin S. Daryoush et al., IEEE Transactions on Microwave Theory and Techniques, vol. MTT–34, No. 12, Dec. 1986, pp. 1363–1369.

Video Transmission Over A 40 GHz Radio–Fibre Link, D. Wake et al., Electronics Letters, vol. 28, No. 21, Oct. 8, 1992, pp. 2024–2025.

Optical Generation Of Very Narrow Linewidth Millimetre Wave Signals, J.J. O'Reilly et al., Electronics Letters, vol. 28, No. 25, Dec. 3, 1992, pp. 2309–2311.

Fibre–supported optical generation and delivery of 60 GHz signals, J.J. O'Reilly and P.M. Lane, Electronics Letters, vol. 30, No. 16, Aug. 4, 1994, pp. 1329–1330.

Generation and Transmission of FM and π/4 DQPSK Signals at Microwave Frequencies Using Harmonic Generation and Optoelectronic Mixing in Mach–Zehnder Modulators, Tom Young et al., Tenth International Conference on Integrated Optics and Optical Fiber Communication—Technical Digest, Jun. 1995, pp. 72–73.

(List continued on next page.)

Primary Examiner—Frank G. Font
Assistant Examiner—Roy M. Punnoose
(74) Attorney, Agent, or Firm—Christensen O'Connor Johnson Kindness PLLC

(57) ABSTRACT

A method and apparatus for harmonically upconverting a phase and/or amplitude modulated subcarrier signal to a higher frequency through a non-linear optical link is disclosed. The method requires that a bandpass signal, with a carrier frequency at a submultiple of the desired radio transmission frequency, be frequency translated in a non-linear two-port device. To avoid the inherent distortion inflicted on the information signal in harmonic upconversion, a predistortion technique is outlined. This consists of phase compression in the case of a phase modulated signal, amplitude scaling in the case of amplitude only and combined phase-amplitude predistortion for QAM type signals. With predistortion on the subcarrier signal input to the non-linear two-port, the resulting upconverted signal may be transmitted in a standard form suitable for demodulation at the signal destination without special equipment.

20 Claims, 3 Drawing Sheets

OTHER PUBLICATIONS

Generation and Transmission of FM and π/4 DQPSK Signals at Microwave Frequencies Using Harmonic Generation and Optoelectronic Mixing in Mach–Zehnder Modulators, Tom Young et al., IEEE Transactions on Microwave Theory and Techniques, vol. 44, No. 3, Mar. 1996, pp. 446–453.

Hybrid Modulator Structures for Subcarrier and Harmonic Subcarrier Optical Single Sideband, Bob Davies and Jan Conradi, IEEE Photonics Technology Letters, vol. 10, No. 4, Apr. 1998, pp. 600–602.

Compatible Optical Single Sideband Modulator Structures for Wireless Applications, Bob Davies and Jan Conradi, Proceedings of Wireless 97: The Ninth International Conference on Wireless Communications, vol. 1, pp. 206–213, Jul. 1997.

Generation of fourth–harmonic microwave signals using Mach–Zehnder modulators, Ali Motamedi and R. Vahldieck, Optical Fiber Conference (OFC) '97 Technical Digest, Feb. 1997, pp. 354–355.

Hybrid harmonic subcarrier optical single sideband with phase predistortion, B. Davies and J. Conradi, Electronics Letters, vol. 34, No. 17, Aug. 20, 1998, pp. 1674–1675.

A Wide–Band Microwave Photonic Phase and Frequency Shifter, S.T. Winnall et al., IEEE Transactions on Microwave Theory and Techniques, vol. 45, No. 6, Jun. 1997, pp. 1003–1006.

Broad–Band Millimeter–Wave Upconversion by Nonlinear Photodetection Using a Waveguide p–i–n Photodiode, T. Hoshida and M. Tsuchiya, IEEE Photonics Technology Letters, vol. 10, No. 6, Jun. 1998, pp. 860–862.

Microwave Generation and Transmission Using Optical Heterodyning or Optical Upconversion Technique, R.P. Braun et al., Proceedings of the 1996 International Topical Meeting on Microwave Photonics, Kyoto, Dec. 3–5, 1996, pp. 53–56.

Optical harmonic upconversion for microwave generation in bidirectional broadband mobile communication system, R.P. Braun et al., Electronics Letters, vol. 33, No. 22, Oct. 23, 1997, pp. 1884–1886.

On Frequency Multiplication in Paraelectrics, L.G. Gassanov et al., Radio Engineering and Electronic Physics, vol. 25, No. 6, Jun. 1980, pp. 96–100.

Frequency Multiplication using Nonlinear Multivalued Devices, Ashraf H. Yahia and M.A. El–Sharkawy, Indian Journal of Pure & Applied Physics, vol. 19, Oct. 1981, pp. 998–1002.

New Modes of Operation for Avalanche Diodes: Frequency Multiplication and Upconversion, Paul–Alain Rolland et al., IEEE Transactions on Microwave Theory and Techniques, vol. MTT–24, No. 11, Nov. 1976, pp. 768–774.

Broadband Frequency Multiplier With Variable Multiplication Factor, P.L. Gluzman and M.P. Morozov, Ribinsk Aviation Technology Institute. Translated from Pribory i Tekhnika Eksperimenta, No. 4, pp. 149–151, Jul.–Aug., 1978. (Enclosed pages are pp. 1006–1008).

High–Frequency Doubler Operation of GaAs Field–Effect Transistors, Christen Rauscher, IEEE Transactions on Microwave Theory and Techniques, vol. MTT–31, No. 6, Jun. 1983, pp. 462–472.

Optical Microwave Generation and Transmission Experiments in the 12– and 60–GHz Region for Wireless Communications, Ralf–Peter Braun et al., IEEE Transactions on Microwave Theory and Techniques, vol. 46, No. 4, Apr. 1998, pp. 320–330.

Transmission of 300 Mbit/s BPSK at 39 GHz using feedforward optical modulation, J.B. Georges et al., Electronics Letters, vol. 30, No. 2, Jan. 20, 1994, pp. 160–161.

* cited by examiner

NON-LINEAR SUBCARRIER PREDISTORTION AND UPCONVERSION SYSTEM

CROSS-REFERENCE TO RELATED APPLICATION

This application is a continuation-in-part of U.S. patent application Ser. No. 08/873,967, filed Jun. 12, 1997, now U.S. Pat. No. 5,999,300, priority from the filing date of which is claimed under 35 U.S.C. §120.

FIELD OF THE INVENTION

This invention relates to subcarrier fiber optic communication systems and radio communications systems; specifically to systems that utilize non-linear behavior to achieve harmonic upconversion of bandpass signals. This disclosure details a method for overcoming the generally inherent phase and amplitude distortion on harmonic upconverters by employing predistortion on the bandpass signal that is harmonically translated in the upconversion device.

BACKGROUND OF THE INVENTION

The transmission of information signals cover radio or other bandpass channels is dependent on the process of modulation. This process requires that the information signal be translated to a suitable carrier frequency that allows the information to be transmitted and detected at the required destination without interference from or with other signals. The standard method for frequency conversion in radio systems is where the information signal and a suitable carrier frequency signal (in this case called a Local Oscillator or 'LO') are combined in a manner that causes the spectral content of the baseband information signal to be translated in the frequency domain from the origin to the range of the LO. An example is the case of cellular telephone transmissions, which use frequency modulation (FM transmission of a voice signal on a radio frequency of approximately 900 MHz. The voice signal has baseband spectral components that fit within a bandwidth of 200 to 3500 Hz whereas the LO is near 900 MHz. The voice or 'baseband' signal is converted to a time varying electronic signal that controls the frequency of the LO in a very narrow range such that the instantaneous frequency of the LO changes linearly with the level of the electronic voice signal. Due to the fact that FM requires more bandwidth than that occupied by the information signal the total bandwidth occupancy of this new carrier signal at the LO or carrier frequency is on the order of 30 kHz—more than the original baseband signal but still much less than that of the carrier. Thus the modulated carrier comprises a narrowband bandpass signal. The modulated carrier is then amplified and transmitted into the radio channel to be received by the called party in the cellular coverage region. At the destination the bandpass signal is translated back to a baseband signal where it is converted to an audible voice signal.

The modulation process may be sectioned into 2 basic functions: Converting the basic lowpass information signal to a bandpass signal and then translating this bandpass signal to a suitable frequency for transmission. These functions are often undertaken in a sequential manner in which the information signal is placed on an intermediate frequency (IF) and then, in a second or multiple operation, the IF is translated through further frequency translation operations to the desired carrier frequency. Often the second function is the most difficult process to achieve, especially if the required transmission frequency is extremely high.

An alternative solution to the problem of attaining extremely high carrier frequencies is found in harmonic upconversion. In this method a bandpass signal at a frequency much lower than the desired carrier frequency is produced in the standard IF mixing operation. The resulting bandpass IF signal is then passed through a non-linear device that produces an ensemble of harmonics of the input signal. The desired harmonic output from the device is captured with a bandpass filter and serves as the upconverted bandpass signal. The relationship between the harmonically upconverted carrier signal and the input carrier signal is determined by the specific harmonic number that was captured at the harmonic upconverter output, which is always an integer. For example, upconversion to a fifth harmonic means that for an input carrier signal at a frequency of $f_c$, the output carrier is at a frequency of $5f_c$.

Harmonic frequency translation is carried out in two-port devices in which the transfer characteristic is inherently non-linear. A general expression for the output from such a deice for a continuous wave (CW) input (in this case $\cos(2\pi f_c t)$) is given by $$R(t) = \sum_{n=-\infty}^{\infty} C_n \exp(jn2\pi f_c t) \qquad (1)$$

where $C_n$ is a coefficient determined by the nature of the non-linearity and $f_c$ is the fundamental input frequency. This is based on the assumption that a periodic input causes a periodic output. Additionally implied is the fact that no sub-harmonics of the input fundamental frequency are of interest in the Fourier series of the output signal. Frequency translation is achieved by capturing one of the higher order output harmonics with a bandpass filter. The bandpass filter removes all but the harmonic component corresponding to the desired frequency at the network output, and so it could be said that the response of the network to the input CW subcarrier signal is one of pure frequency translation of the original signal. If in the case of a modulated input, the information characteristics can be preserved through the frequency translation process, a system benefit is accrued in certain situations.

Radio on Optical Non-Linear Upconverters

Fiber optic communication systems have typically been used in broadband configurations to trunk large amounts of baseband information over long distances. The larger bandwidth and relatively low loss characteristics of optical fiber have made it useful for the efficient transport of large information bandwidths at relatively low cost. Lately, fiber optic subsystems are finding more application in systems that were typically designed for electronic radio. CATV, Radar and some cellular and PCS subsystems now employ optical links that allow system operators to extend the coverage region or move more TV channels over wider distribution areas. Emerging Multipoint Communications Systems such as local multipoint distribution services (LMDS) will involve the delivery of broadband signals to residential sites via radio carriers in the 20 to 60 GHz range. The use of fiber is likely to increase greatly when these new services place enormous demands on existing service delivery systems and subscriber loop infrastructure. The latter systems, which are the focus of this document, primarily operate in a subcarrier mode where the signal that is modulated onto the optical carrier is itself a modulated carrier wave that upon detection (or optical demodulation) will once again be a modulated radio (or radio compatible) bandpass signal.

The harmonic upconversion potential for optical devices is well characterized and has been extensively studied. See Afshin S. Daryoush, Peter R. Herczfeld, Zygmond Turski, Pradeep K. Wahi, *Comparison of Indirect Optical Injection Locking Techniques of Multiple X-Band Oscillators,* IEEE Transactions on Microwave Theory and Techniques, Vol. MTT-34, No. 12, pp 1363–1369, December 1986.

Wake, D., Smith I. C., Walker N. G. Henning, I. D., Carver, R. D., "Video Transmission Over A 40 GHz Radio-Fibre Link," *Electronics Letters,* Vol. 28, No. 21, pp 2024–2025.

J. J. O'Reilly, P. M. Lane, R. Heidemann, R. Hofstetter, "Optical Generation of Very Narrow Linewidth Millimeter Wave Signals", *Electronics Letters,* vol. 28, no. 25, pp. 2309–2311, December, 1992.

J. J. O'Reilly, P. M. Lane, M. H. Capstick, H. M. Salgado, R. Heidemann, R. Hofstetter, H. Schmuck, "RACE 2005: Microwave Duplex Optical Antenna Link", *IEE Proceedings-J,* vol. 140, no. 6, pp. 385–391, December 1993.

O'Reilly, J. J.; Lane, P. M. Fibre-supported optical generation and delivery of 60 GHz signals, *Electronics Letters,* Vol 30, No. 16, pp 1329–1330, Aug. 4, 1994.

Tom Young, Jan Conradi, Wayne Tinga and Bob Davies. "Generation and Transmission of FM and π/4 DQPSK Signals at Microwave Frequencies Using Harmonic Generation and Optoelectronic Mixing in Mach Zehnder Modulators", *Tenth International Confference on Integrated Optics and Optical Fiber Communication—Technical Digest,* vol. 4, pp. 72–73, June 1995.

Tom Young, Jan Conradi and Wayne Tinga, "Generation and Transmission Of FM and π/4 DQPSK Signals at Microwave Frequencies Using Harmonic Generation and Opto electronic Mixing in Mach-Zehnder Modulators." *IEEE Transactions on Microwave Theory and Techniques,* vol. 44, no. 2, pp. 446–453, March 1996.

Bob Davies and Jan Conradi, *Hybrid Modulator Structures for Subcarrier and Harmonic Subcarrier Optical Single Sideband,* Phototonics Technology Letters, Vol. 10, No. 4, April 1998.

Bob Davies, Jan Conradi, *Compatible Optical Single Sideband Modulator Structures for Wireless Applications,* Wireless 97, July, 1998.

Robert J. Davies Jan Conradi David Dodds, "Hybrid single Sideband Optical Modulator", Ser. No. 08/873,967, Filed Jun. 12, 1997.

Ali Motamedi, R. Vahldeick, "Generation of fourth harmonic microwave signals using Mach-Zehnder modulators", *Optical Fiber Conference OFC-97 Technical Digest,* pp. 354–355, February 1997.

Bob Davies and Jan Conradi, "Hybrid harmonic subcarrier optical single sideband with phase predistortion", *Electronics letters,* vol. 34, no. 17, pp. 1674–1675, August 1998.

Robert Olshansky, "Optical Modulator For Cancellation of Second-Order Intermodulation Products In Lightwave Systems", U.S. Pat. No. 5,239,401, August 1993.

Winnall, S. T.; Lindsay, A. C.; Knight, G. A., "Wide-band microwave photonic phase and frequency shifter," *IEEE Transactions on Microwave Theory and Techniques,* vol. 45, no. 6, June 1997.

Hoshida, T.; Tsuchiya, M. "Broad-band millimeter-wave upconversion by nonlinear photodetection using a waveguide p-i-n photodiode," *IEEE Photonics Technology Letters,* vol. 10, no. 6, pp. 860–862, June 1998.

Braun, R. P.; Grosskopf, G.; Rohde, D.; Schmidt, F. "Microwave generation and transmission using optical heterodyning or optical upconversion," *Proceedings of the 1996 International Topical Meeting on Microwave Photonics,* pp. 53–56, Kyoto, Dec. 3–5, 1996.

Braun, R.-P.; Grosskopf, G.; Meschenmoser, R.; Rohde, D.; Schmidt, F.; Villino, G "Optical harmonic upconversion for microwave generation in bidirectional broadband mobile communication system," *Electronics Letters* vol. 33 no 22 October 1997.

Chen; Chung Y., Newberg; Irwin L., "Frequency multiplying electro-optic modulator, configuration and method," U.S. Pat. No. 5,040,865 Aug. 20, 1991.

Disclosures of prior art outline many types of non-linear optical link/harmonic upconverters. A clearer conceptualization of the details of signal predistortion is gained by observing a typical optical link configured for harmonic upconversion.

SUMMARY OF THE INVENTION

There is provided according to the invention a method and apparatus for harmonically upconverting a phase and/or amplitude modulated subcarrier signal to a higher frequency through a non-linear optical link is disclosed. The method requires that a bandpass signal, with a carrier frequency at a submultiple of the desired radio transmission frequency, be frequency translated in a non-linear two-port device. To avoid the inherent distortion inflicted on the information signal in harmonic upconversion, a predistortion technique is outlined. This consists of phase compression in the case of a phase modulated signal, amplitude scaling in the case of amplitude only and combined phase-amplitude predistortion for QAM type signals With predistortion on the subcarrier signal input to the non-linear two-port, the resulting upconverted signal may be transmitted in a standard form suitable for demodulation at the signal destination without special equipment.

BRIEF DESCRIPTION OF THE FIGURES

There will now be described preferred embodiments of the invention with reference to the drawings in which like reference characters denote like elements and in which.

DETAILED DESCRIPTION OF PREFERRED EMBODIMENTS

Figure 1:
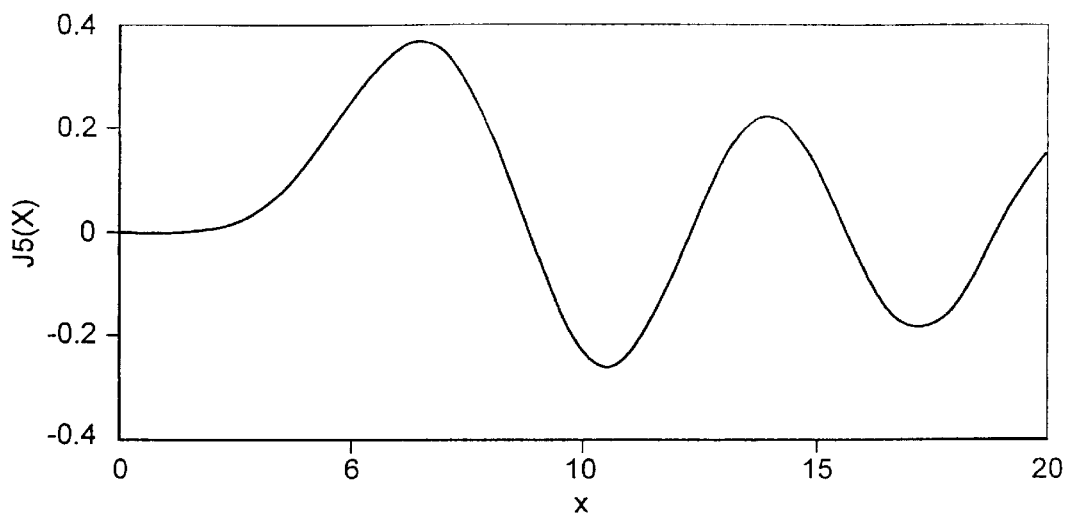
FIG. 1 shows a fifth order Bessel function.

Analysis of equation (1) shows that there are concerns relating to distortion of the input signal as is shown in the output expression for a harmonic frequency translation device for a phase modulated input given by $\cos[2\pi f_c t + \phi(t)]$:

$$R(t) = \sum_{n=-\infty}^{\infty} C_n \exp\{jn[2\pi f_c t + \phi(t)]\}. \qquad (2)$$

The phase information, $\phi(t)$, is multiplied in the same manner as the carrier term resulting in distortion. Additionally, the amplitude of the input carrier signal is distorted due to the generally nonlinear relationship between the output and input amplitude portions of the signal. This is determined by the nature of the nonlinear method used to upconvert the input carrier signal.

The inventor has proposed that if the phase portion of the argument of the desired harmonic in equation (3) was divided by the harmonic number as in $$R(t) = \sum_{n=-\infty}^{\infty} C_n \exp\left\{jn\left[2\pi f_c t + \frac{\phi(t)}{n}\right]\right\}, \quad (3)$$

then the phase distortion would be removed for the desired harmonic at the device output. If the carrier signal input to the harmonic upconverter was additionally amplitude modulated as in $\alpha(t)\cos[2\pi f_c t + \phi(t)]$, then the amplitude would require a specific predistortion that is related to the type of harmonic upconverter used. This will be addressed in the next section.

We now describe an embodiment of a harmonic upconverting optical communication system consisting of a Mach Zehnder Interferometric Modulator (MZM) coupled via a fiber transmission line to a square-law photodetector optical receiver. The MZM is a balanced bridge interferometer that allows amplitude and phase modulation of the optical carrier. The ideal MZM consists of an optical splitter coupled to two identical phase modulating waveguide devices, which are in turn connected to an optical combiner. The dielectric constant of the waveguides is electronically modulated by application of a voltage to the electrodes either covering or adjacent to the waveguide channels. Application of proper bias voltages to establish phase imbalance conditions in addition to modulation allows a variety of modulation schemes to be implemented in the MZM. The basic input/output relation for the MZM is given by $$E_{out} = E_{in}\left\{\exp\left(j\pi m_{mz}\frac{v_1(t)}{V_\pi}\right) + \exp\left[j\left(\frac{\pi m_{mz}v_2(t)}{V_\pi} + V_{bias}\right)\right]\right\} \quad (4)$$

where $E_{in}$ and $E_{out}$ are input and output optical signals, $v_1(t)$ and $v_2(t)$ are the normalized modulating voltages (maximum amplitude of unity) applied to the modulating arms of the MZM, $V_{bias}$ is the applied phase bias voltage and $V_\pi$ is the modulator extinction voltage. The applied voltages are defined relative to $V_\pi$, which is the voltage differential applied to the electrodes, required to extinguish the optical output for a sinusoidal optical input. The outputs from the respective phase modulators have a differential dielectric constant so as to produce a phase shift of $\pi$ radians between the modulating arms. For the purpose of analysis we will define $m_{mz}$ as a factor that controls the peak amplitude of $v_1(t)$ or $v_2(t)$ relative to $V_\pi$. If we further specify that $V_\pi$ be set to unity then $m_{mz}$ represents a modulation index of the peak modulating voltage relative to the $V_\pi$. Thus (4) becomes $$E_{out}=E_{in}\{\exp(j\pi m_{mz}v_1(t)+\exp[j(\pi m_{mz}v_2(t)+V_{bias})]\} \quad (5)$$

The MZM may be driven in numerous modes for subcarrier operation. We illustrate the case for harmonic upconversion modulation for the standard differential drive in which $v_2(t)=v_1(t)$ which gives an optical electric field transfer characteristic of $$E_{out}(t) = E_{in}\cos\left[\pi m_{mz}v_1(t) + \frac{V_{bias}}{2}\right]. \quad (6)$$

Setting $v_1(t)=\cos(2\pi f_c t)$ and $V_{bias}/2$ to $\pi/2$, (6) may be given as $$E_{out} = E_{in}\cos\left(\pi m_{mz}\cos(2\pi f_c t) + \frac{\pi}{4}\right) \quad (7)$$

$$= E_{in}\left\{J_0(\pi m_{mz}) + \sum_{n=1}^{\infty}(-1)^n J_n(\pi m_{mz})\cos(2\pi n f_c t)\right\}$$

where $J_n(x)$ is the $n^{th}$ order Bessel function of the first kind with argument (x). If $E_{in}$ is a CW optical carrier, it may be removed and only the complex envelope of the optical electric signal need be observed which is given by $$E_{C_{out}} = \left\{J_0(\pi m_{mz}) + \sum_{n=1}^{\infty}(-1)^n J_n(\pi m_{mz})\cos(2\pi n f_c t)\right\}. \quad (8)$$

In intensity modulated direct detection (IMDD) fiber links, the detector device has a 'square law' property. This means that the output current of the detector is directly proportional to the optical input power, which is in turn proportional to the square of the optical E-field. In terms of the Mach Zehnder output expression the output of the detector is given by the squared envelope of (6)

$$I_D = \cos^2\left(\pi m_{mz}\cos(2\pi f_c t) + \frac{\pi}{4}\right) \quad (9)$$

$$= \frac{1}{2} - \sin(2\pi m_{mz}\cos(2\pi f_c t))$$

$$= \frac{1}{2} - \sum_{n=1}^{\infty}(-1)^{n+1}J_{2n-1}(2\pi m_{mz})\cos(2n-1)(2\pi f_c t)$$

It is apparent from (9) that only odd harmonic terms are present in the output spectrum. Thus for an input subcarrier of frequency $f_c$, harmonics on the order of $n \cdot f_c$; $n=1,3,5,\ldots$ will be present in the detector output. This expression has an inherent doubling of the Bessel Function argument which, due to the characteristics of Bessel functions, can result in a more efficient redistribution of the power content of detected signal into the higher harmonics. It is also clear that by the original development of the phase compression method, the MZM-IMDD based optical link is a suitable network for harmonic upconversion.

If a narrowband bandpass phase modulated subcarrier were applied to the MZM instead of a pure tone, the expression in (8) would be altered to $$I_D = \left\{\frac{1}{2} - \sum_{n=1}^{\infty}(-1)^{n+1}J_{2n-1}(2\pi m_{mz})\cos(2n-1)(2\pi f_c t + \phi(t))\right\} \quad (10)$$

Note the phase distortion due to the harmonic multiplier term $(2n-1)$. To preserve the phase argument in the harmonic process it is necessary to divide the phase term $\phi(t)$ by the harmonic number $(2n-1)$ to give $$I_D = \left\{\frac{1}{2} - \sum_{n=1}^{\infty}(-1)^{n+1}J_{2n-1}(2\pi m_{mz})\cos\left[(2n-1)\left(2\pi f_c t + \frac{\phi(t)}{2n-1}\right)\right]\right\} \quad (11)$$

$$= \left\{\frac{1}{2} - \sum_{n=1}^{\infty}(-1)^{n+1}J_{2n-1}(2\pi m_{mz})\cos[(2n-1)(2\pi f_c t) + \phi(t)]\right\}$$

Thus predistortion of the phase of the input phase modulated sinusoid results in a harmonically upconverted signal with undistorted phase modulation.

Amplitude Predistortion

While phase distortion for harmonic upconversion is always implemented by dividing the absolute value of the phase by the desired harmonic number, suitable methods for amplitude predistortion are determined by the particular nonlinear link. For this reason the amplitude distortion characteristic of the harmonic upconverter must be well characterized. In the case of the above MZM-IMDD link, each harmonic amplitude follows a Bessel function so, for a Bessel Function expansion, the amplitude need only be scaled according to the particular desired harmonic and the actual value of the relative scaling of the amplitude on the fundamental modulating signal to be upconverted. Considering the output expression for the harmonic upconverter composed of a MZM-IMDD optical link, an amplitude modulation process simply allows the '$m_{mz}$' term to be time varying in addition to the time varying phase terms. The form of the new expression for the input bandpass signal is $v_1(t)=\alpha(t)\cos(2\pi f_c t+\phi(t))$, so that the detector output is given by $$I_D = \left\{ \frac{1}{2} - \sum_{n=1}^{\infty} (-1)^{n+1} J_{2n-1}[2\pi m_{mz}\alpha(t)]\cos(2n-1)(2\pi f_c t + \phi(t)) \right\} \quad (12)$$

Incorporating the modulation index and scaling factor in the Bessel function argument into the time varying amplitude gives $$I_D = \left\{ \frac{1}{2} - \sum_{n=1}^{\infty} (-1)^{n+1} J_{2n-1}[\alpha(t)]\cos(2n-1)(2\pi f_c t + \phi(t)) \right\} \quad (13)$$

To achieve the proper amplitude prescaling we predistort the amplitude term $\alpha(t)$ by the inverse of the Bessel function at the harmonic of interest. To acquire the fifth harmonic, the amplitude of the input signal must be prescaled by the inverse of the fifth order Bessel term function for the range of the modulating signal. To illustrate, the fifth order Bessel function versus input argument 'x' is shown in FIG. 1.

Figure 2:
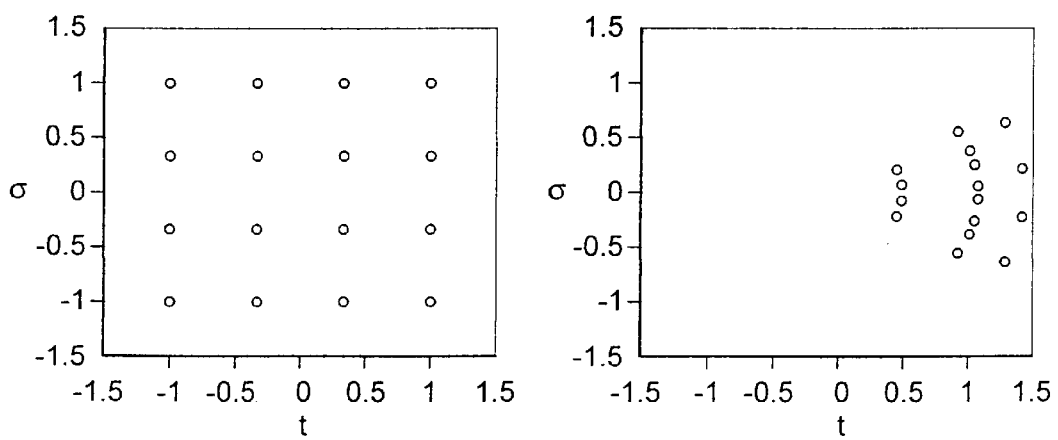
FIG. 2 contains graphs showing (a) normal and (b) predistorted 16QAM Constellations.

A suitable scaling would be to map the amplitude of the amplitude/phase modulated signal into the section of the abscissa of FIG. 1 so as to produce a linear response in this case of the fifth order Bessel function for arguments between 3.5 to 6. The resulting output bandpass signal at the fifth harmonic of the input signal would have the correct phase and amplitude. For a 16QAM signal the normal constellation and predistorted constellation for 5th order harmonic upconversion are shown in FIG. 2.

Notice how the phase is compressed into one-fifth of its normal excursion and the amplitude of the signal constellation vector is additionally compressed by the Bessel scaling. When the signal with the predistorted constellation is upconverted in the MZM-IMDD optical link the amplitude and phase of the fifth harmonic will return to their standard form as shown in the undistorted constellation in FIG. 2.

Clipping

Figure 3:
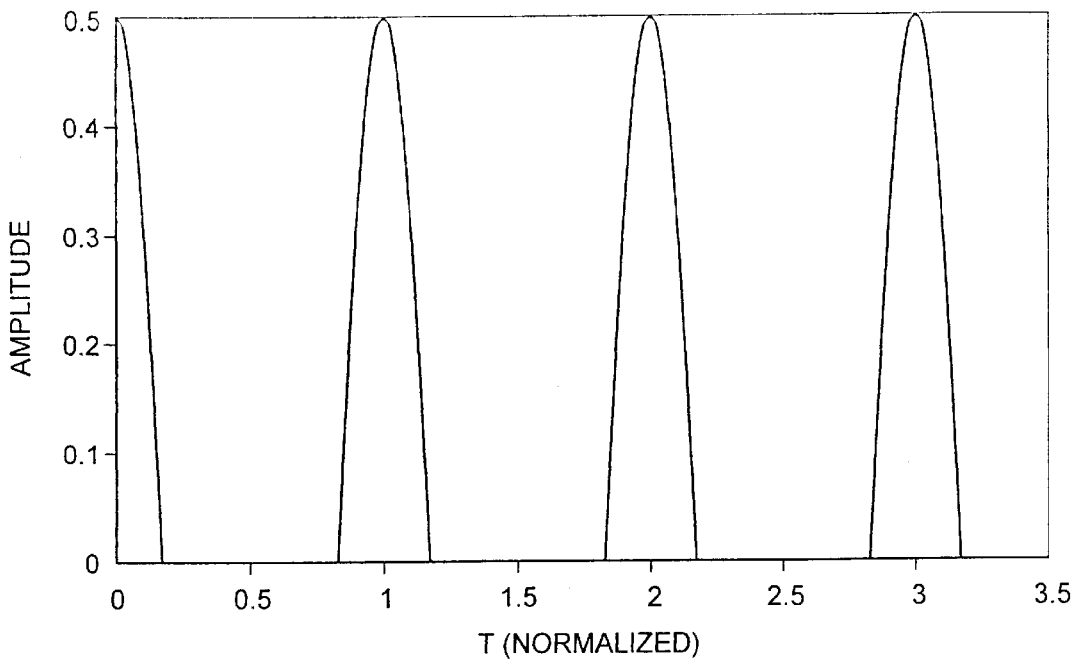
FIG. 3 shows a clipped sinusoid.
Figure 4:
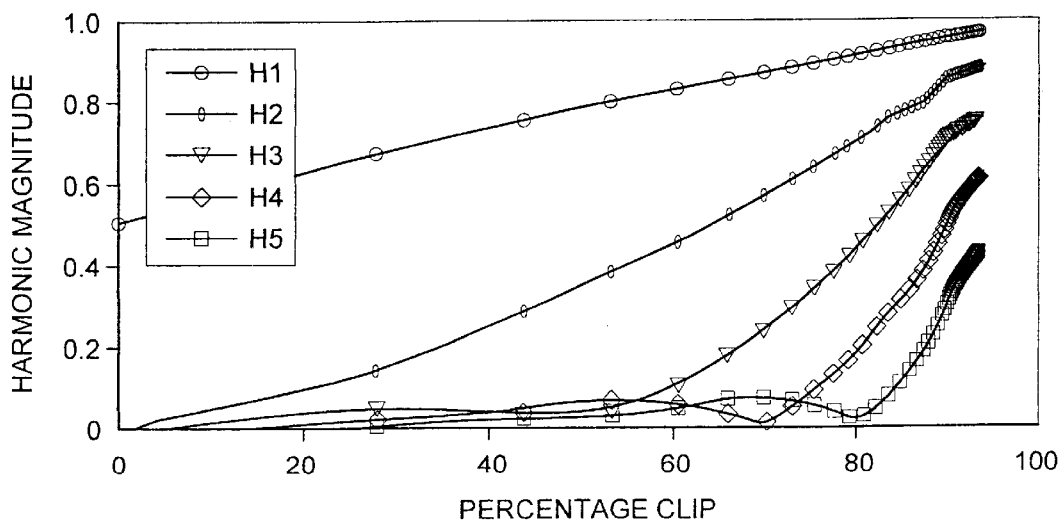
FIG. 4 shows harmonic magnitude vs percentage clip.

Another method of achieving harmonic upconversion on radio/fiber links is through the use of clipping. Clipping is most commonly observed in a laser diode optical source modulator. From the perspective of a sinusoidal signal RF drive signal this entails cutting off a section of the upper or lower part of the waveform as shown in FIG. 3.

This results in the presence of high frequency components in the resulting clipped waveform. The higher frequency components in the spectrum of the clipped signal increase in relative magnitude as the relative portion of the clipped section of the sinusoid becomes larger. FIG. 3 shows the relationship between the harmonic amplitudes and the percentage clip of the input sinusoid.

It should be noted that the power in the clipped waveform may change as the relative portion of the clipped section increases. Thus the amplitude scaling of the modulation index that is used to predistort the input amplitude modulated signal must take this into account. This phenomenon was not observed in the previous optical modulator disclosure. Clipping may be applied directly to a modulated sinusoid thus achieving direct upconversion from a fundamental modulated sinusoid without modulating an optical carrier. Clipping may be applied to the negative portion of the waveform as above or the positive portion or to both positive and negative as in double sided clipping. As with the previous MZ-IMDD link phase predistortion is achieved by division of the phase of the input subcarrier signal and amplitude predistortion is achieved by prescaling according to the magnitude behavior of the desired harmonic as a function of input amplitude fluctuation.

Other Non-optical Methods of Harmonic Upconversion

Harmonic behavior may be observed in any device that alters the shape of an input sinusoidal waveform in a non-linear manner. Additionally the non-linearity may be described in approximate fashion in terms of the mathematical transformation that it performs on the input waveform. These operations may include the power operator ($x^n$) a polynomial operator ($a_0 x^n + a_1 x^{n-1} + a_2 x^{n-2} + \ldots a_n$), any type of waveform transformation such as sine to square wave, sine to triangle, saw-tooth or any other non-linear transformation. See L. G. Gassanov, S. V. Koshevaya and M. YU. Omel'yaanenko, "On frequency Multiplication in Paraelectrics," *Radio Engineering and Electronic Physics*, vol. 25, no. 6, pp 96–100, June 1980.

Ashraf H. Yahia & A. A. El-Sharkawy, "Frequency Multiplication in Nonlinear Multivalued Devices," *Indian Journal of Pure & Applied Physics.*, vol. 19, pp 998–1002, October 1980.

Paul-Alain Rolland, J. L. Vaterkowski, Eugene Constant, and George Salmer, "New Modes of Operation for Avalanche Diode Frequency Multiplication and Upconversion," *IEEE Transactions on Microwave Theory and Techniques*, vol. MTT-24, no. 11, November, 1976.

P. L. Gluzzman and M. P. Morozov, "Broadband Frequency Multiplier with Variable Multiplication Factor," Ribinsk Aviation Technology Institute, *Translated from Pribory i Tekhnika Eksperimenta*, no. 4, pp 149–151, July–August 1978.

Christen Rauscher, "High-Frequency Doubler Operation of GaAs Field-Effect Transistors," *IEEE Traansactions on Microwave Theory and Techniques*, vol. MTT-31, no. 6, pp. 462–472 June, 1983.

An Implementation of the Invention

Figure 5:
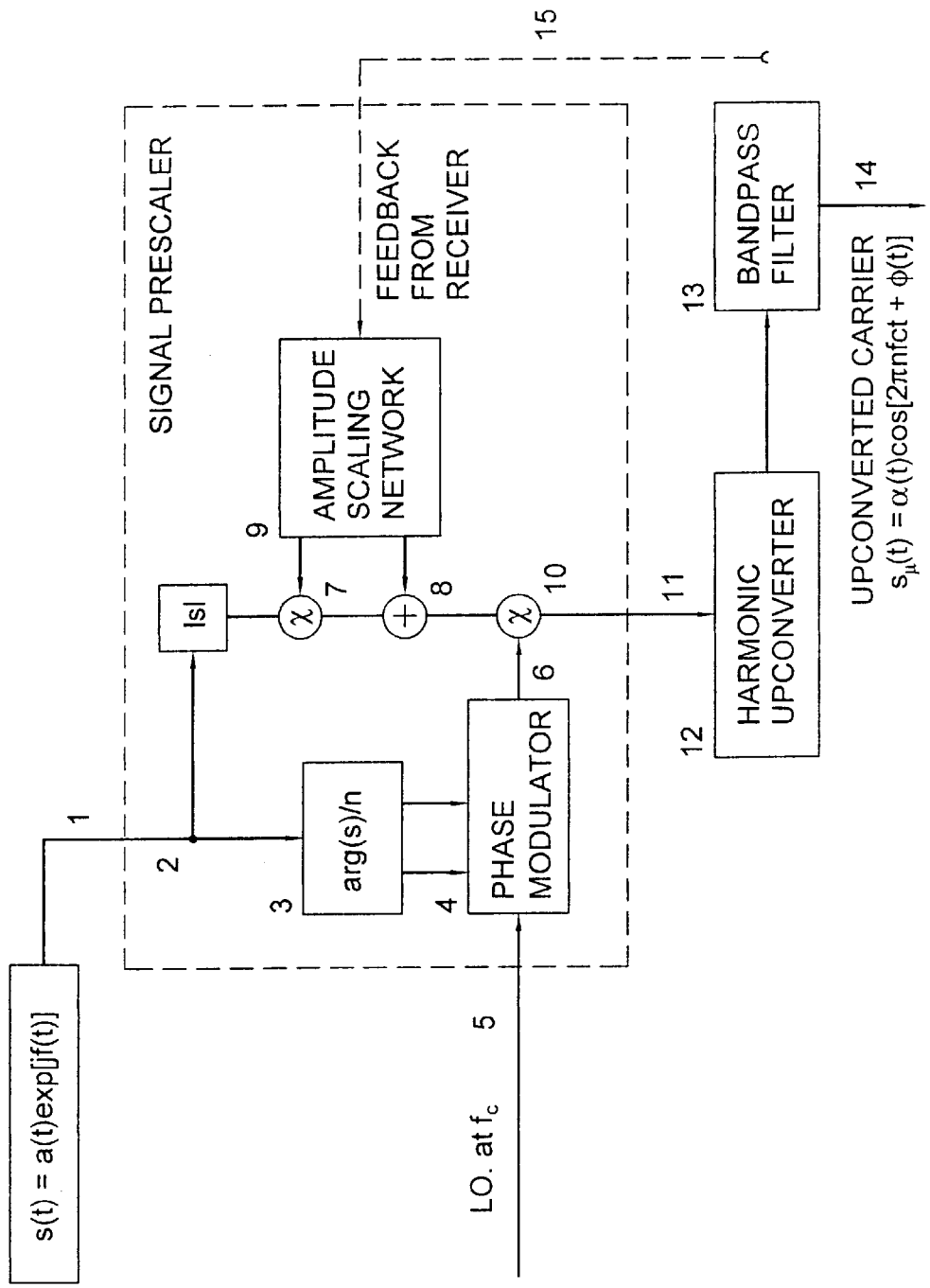
FIG. 5 is a schematic showing an exemplary phase and amplitude pre-scaler according to the invention.

The device shown in FIG. 5 consists of 2 sections: a signal prescaler and a generalized harmonic upconverter.

The signal takes as input at 1 a baseband signal in the form of as complex envelope and phase given by $s(t)=a(t)\exp[jf(t)]$. Inside the prescaler the input signal is separated at 2 into its envelope $|s|$ and phase components. The phase component is passed to the phase division circuit at 3 [arg(s)/n] where it is mapped into the predistorted phase signal. The predistorted phase signal is then passed to the phase modulator at 4. The phase signal is then modulated onto the fundamental subcarrier Local Oscillator signal 5 to produce a phase modulated bandpass signal at 6.

The signal magnitude is scaled at 7 and a DC offset is added at 8 according to the values determined by the amplitude scaling network at 9. The amplitude portion of the predistorted signal is now suitable to be amplitude modulated on to the phase modulated carrier in the amplitude modulator at 10. The signal at 11 is the predistorted bandpass signal and is passed to the harmonic upconverter 12. In the harmonic upconverter, harmonics of the input signal are produced and output to the bandpass filter 13. The bandpass filter then rejects all but the desired harmonic, which is transmitted as the desired bandpass signal 14.

A feedback signal 15 is employed in some cases to optimize the amplitude scaling rule. This function would use information transmitted back to the signal prescaler in suitable fashion to optimize the parameters used in the amplitude scaling network. This method would follow a standard finction minimization algorithm, several of which contained in prior art, see William H. Press, Brian P. Flannery, Saul A Teulzolsky, William T. Vetterling, *Numerical Recipes in C*. Cambridge UK, 1988.

The method presented herein would be usable on any phase signal and any combined phase amplitude signal that was suitably predistorted. As an added feature 'dummy' phase shifts can be incorporated in to the transmitted constellation so as to separate the constellation points and increase the transmitted signal to noise ratio should this issue arise due to close packing of constellation points. These phase shifts would be of such a value that the harmonic upconversion process would simply add al invisible n·2π radians to the phase of the constellation points. This would be of most concern where there was increased noise at the transmitter that would affect the signal to noise in the transmitted signal.

In another embodiment of the method, phase and amplitude predistortion circuitry could be made to operate on an incoming bandpass signal rather than a baseband signal. This would allow the use of the device on pre-existing, systems. In this method a bandpass signal is modulated in standard fashion to be a phase, amplitude or quadrature modulated signal. This bandpass signal is taken as input to the signal prescaler section where it is demodulated and the amplitude and phase components of the demodulated signal are operated on as in the baseband predistortion circuit outlined above. This embodiment requires the addition of a quadrature demodulation subsystem at the input to the signal prescaler section in FIG. 5. This type of circuit is well known in prior art.

While the previous method has been described within the context of a preferred embodiment, it is not intended to limit the scope of the invention to the form set forth. Alternatively it is intended to cover such alternatives, modifications, and equivalents as may be included in the spirit and scope of the method as defined in the appended claims.

What is claimed is:

1. A method of subcarrier harmonic modulation of an information signal, the method comprising the steps of:
    predistorting at least one of the phase and amplitude of the information signal; and
    harmonically frequency translating the information signal to a higher frequency corresponding to higher order harmonics at integer multiples of an input carrier frequency.

2. The method of claim 1 in which the information signal is a quadrature information signal having a phase and amplitude and the phase of the quadrature information signal is predistorted.

3. The method of claim 2 in which the information signal is a quadrature information signal and the amplitude of the quadrature information signal is predistorted.

4. The method of claim 1 in which the information signal is a real signal and the amplitude of the real information signal is predistorted.

5. The method of claim 1 which the information signal is a baseband information signal.

6. The method of claim 2 which the information signal is a baseband information signal.

7. The method of claim 3 which the information signal is a baseband information signal.

8. The method of claim 4 which the information signal is a baseband information signal.

9. The method of claim 1 in which the information signal is a demodulated bandpass signal.

10. The method of claim 2 in which the information signal is a demodulated bandpass signal.

11. The method of claim 3 in which the information signal is a demodulated bandpass signal.

12. The method of claim 4 in which the information signal is a demodulated bandpass signal.

13. A subcarrier harmonic modulation system comprising:
    a continuous wave subcarrier signal source;
    a phase modulator for phase modulating the signal emitted from the continuous wave subcarrier signal source;
    a connecting channel between the subcarrier signal source and the phase modulator;
    a phase predistortion device that takes as input a baseband signal and operates on the phase component of the baseband signal so as to predistort the phase of the baseband signal into a predetermined phase signal suitable for phase modulation of the subcarrier signal with the phase modulator;
    an amplitude modulator for amplitude modulating the signal emitted from the phase modulator;
    a connecting channel between the phase modulator and the amplitude modulator;
    an amplitude predistortion device that takes as input a baseband signal and operates on the bandpass signal so as to predistort the amplitude behavior thus producing a signal suitable for amplitude modulation of the signal from the phase modulator with the amplitude modulator;
    a harmonic frequency translation device comprising a non-linear two-port device that operates on an input bandpass signal so as to produce higher order harmonics of the input signal through non-linear distortion of the input signal;
    a connecting channel between the amplitude modulator and the harmonic frequency translation device, such that the harmonic translation device translates the bandpass signal from the amplitude modulator to a higher harmonic multiple of the bandpass carrier frequency; and
    a bandpass filter connected to the output of the harmonic frequency translation device to capture a desired harmonic and reject the unwanted harmonics.

14. The subcarrier harmonic modulation system of claim 13 in which the harmonic frequency translation device is an optical signal modulation system for modulating an optical carrier, the optical signal modulation system comprising:
    an optical signal generator;
    a modulator for modulating phase and amplitude of optical signals from the optical signal generator, connected to the output of the optical signal generator, the modulator being cascaded with the generator;
    an optical light guide or fiber transmission line, connected to the modulator for transporting the optical signal from the optical modulator to an optical receiver;
    the optical receiver being connected to the optical light guide or fiber for capturing the optical signal and converting the optical signal to an electronic signal; and a bandpass filter connected to the output of the optical receiver for capturing a desired harmonic and reject unwanted harmonics.

15. The optical subcarrier harmonic modulation system of claim 13 in which the harmonic frequency translation device comprises a non-linear optical two port communication system.

16. The optical subcarrier harmonic modulation system of claim 13 in which the harmonic frequency translation device comprises a non-linear two port device.

17. The optical subcarrier harmonic modulation system of claim 13 further comprising a feedback circuit configured to acquire signal quality information from a receiver and return this information to the amplitude predistortion circuit such that the amplitude predistortion iteratively approaches an optimal state for the specific method of harmonic upconversion.

18. The optical subcarrier harmonic modulation system of claim 14 further comprising a feedback circuit configured to acquire signal quality information from a receiver and return this information to the amplitude predistortion circuit such that the amplitude predistortion iteratively approaches an optimal state for the specific method of harmonic upconversion.

19. A phase predistortion method in which the original phase portion of a quadrature information signal is predistorted such that when the predistorted phase is modulated onto a radio carrier so as to produce a bandpass signal and the bandpass signal is subsequently translated in frequency through a harmonic upconversion device, causing the phase of the bandpass signal to be further altered by the upconversion process, the phase of the upconverted bandpass signal returns to the original phase state.

20. An amplitude predistortion method in which the original amplitude portion of a quadrature information signal is altered such that when the altered amplitude signal is modulated onto a radio carrier so as to produce a bandpass signal and the bandpass signal is subsequently translated in frequency through a harmonic upconversion device, causing the amplitude of the bandpass signal to be farther altered by the upconversion process, the amplitude of the upconverted bandpass signal returns to the original amplitude state.

* * * * *